United States Patent

Mossey

[15] 3,696,678

[45] Oct. 10, 1972

[54] WEIGHTED OPTICAL TEMPERATURE MEASUREMENT OF ROTATING TURBOMACHINERY

[72] Inventor: Paul W. Mossey, Cincinnati, Ohio

[73] Assignee: General Electric Company

[22] Filed: April 21, 1969

[21] Appl. No.: 817,747

[52] U.S. Cl. .........................73/346, 73/351, 73/355
[51] Int. Cl. ..............................................G01j 5/06
[58] Field of Search ..........73/351, 355, 346; 356/43; 235/151.3, 151.31

[56] References Cited

UNITED STATES PATENTS 3,510,057    5/1970    Werme ........................73/355

*Primary Examiner*—Louis R. Prince
*Assistant Examiner*—Denis E. Corr
*Attorney*—Derek P. Lawrence, Loren W. Peters, Lee H. Sachs, Frank L. Neuhauser, Oscar B. Waddell, Joseph B. Forman and Thomas J. Bird, Jr.

[57] ABSTRACT

An optical pyrometry system for measuring temperature in hydrocarbon fueled gas turbine engines is disclosed wherein means are provided for weighting the instantaneous output of an infrared sensing device. Because of the random occurrence of interposition of carbon particles between the sensing device and a selected metal surface, the weighting means are able to compensate for carbon particle interference effects on infrared radiation and to provide a meaningful indication of both metal surface temperature and gas temperature. Temperature of the selected metal surface is determined by applying a high weighting to data read during the short time intervals when the gas becomes clear and a low weighting to data read at all other times, i.e., weighting the sensing device output toward minimum values obtained; and combustion gas temperature is determined by weighting the sensing device output toward peak values obtained, when represent primarily radiation emission from carbon particles.

10 Claims, 3 Drawing Figures

WEIGHTED OPTICAL TEMPERATURE MEASUREMENT OF ROTATING TURBOMACHINERY

The invention described and claimed in the United States patent application herein resulted from work done under United States Government contract FA-SS-67-7. The United States Government has an irrevocable, non-exclusive license under said application to practice and have practiced the invention claimed herein, including the unlimited right to sublicense others to practice and have practiced the claimed invention for any purpose whatsoever.

BACKGROUND OF THE INVENTION

This invention relates to infrared pyrometry systems and more particularly to such systems adapted to measure temperatures in gas turbine engines.

The proper operation of gas turbine engines requires controlling the various parameters which affect component life and component and overall engine performance. One important parameter affecting component life is the turbine rotor blade temperature, which must be limited to permit reasonable periods between engine overhauls.

Another parameter, turbine inlet gas temperature, has a direct effect on engine performance and also affects the reliable life of the various components, including the turbine, that are heated by combustion gas.

The first parameter mentioned, turbine rotor blade temperature, is sensed generally on all aircraft gas turbine engines during development. Thermocouples are commonly used; however, they are not applied to the turbine blades of production engines because of their relatively short life in the temperature environment of the turbine rotor blades.

The second parameter mentioned, turbine inlet gas temperature, up to the present time was not sensed directly on either current development engines or production engines because of the lack of an accurate sensing technique. Turbine inlet gas temperature is, however, measured indirectly on many production engines by measuring with thermocouples the turbine exhaust temperature (which is low enough to permit use of thermocouple probes) and relating it to turbine inlet gas temperature according to the particular turbine energy extraction characteristic. While providing presently satisfactory performance, this technique does, however, have accuracy limitations which, if overcome, would permit higher performance levels for particular engines.

Because of the high temperatures present in the combustion section of the gas turbine engine, it is impractical to directly measure turbine inlet gas temperature using present sensing techniques. The technique of optical pyrometry would be one method of measuring the temperature of turbine rotor blades and turbine inlet gases without the limitations on maximum temperature existent for thermocouple measuring; however, it has not been used to date because of carbon particle interference effects which deprive the pyrometry technique of the accuracy required for gas turbine engine monitoring and control, a problem which prior to the invention described herein had not been satisfactorily solved.

On a gas turbine engine, the pyrometer would be located just outside the engine frame, with a viewing porthole installed in the frame, permitting a view of the blades as they pass all other metal parts in the engine. Part of this viewing path must of necessity pass through the combustor nozzle exhaust gases which surround the turbine rotor blades in normal operation of the engine. These gases frequently contain fine dispersions of carbon particles which are generated in a normally operating turbulent mixing, fossil fuel fired gas turbine combustor. Although the mass fraction of this unburned carbon to the original fuel is extremely low and has only a negligible effect on combustion efficiency, the finest dispersion can have a severe effect on the accuracy of an ordinary optical pyrometer, particularly if the carbon particle temperature is different from that of the blade surface being viewed.

When a prior art optical pyrometer operating in either the visible or infrared spectrum views the blade through the dispersed carbon cloud, it averages the temperature of the blade surface and the carbon particles. It would be possible only in theory to calculate the blade temperature from this average if one knew the carbon particle size distribution and concentration as well as particle temperature. An additional problem is that particle concentration typically varies rapidly with time and location due to the turbulent nature of the gas stream and variations with time of the particle generation rate in the combustor.

During the course of attempts to measure turbine blade temperature, a phenomena was discovered in the gas surrounding the turbine blades. The concentration of carbon particles in the flame in the region of the turbine rotor blades during normal engine operation varies both spacially and temporally. The carbon concentration has such extreme variations that there are occasional short-time intervals when the flame becomes exceptionally clear, i.e., practically devoid of all carbon particles. The time interval during which clear flame occurs adjacent to the blade typically lasts only 100 millionths of a second. An unusually long time interval may last 400 millionths of a second. It was further discovered in studying oscilloscope traces of the output signal from a thermoradiation detector mounted on one test engine that these clear flame intervals occur approximately 10 percent of the running time of the particular engine. This percentage will, of course, vary from engine to engine depending upon combustor design, air flow and turbulence patterns in the particular combustor, and smoking tendencies of the combustor. In an oscilloscope trace, the clear flame intervals are characterized by definitive minimums in the instantaneous output of the infrared sensing head.

A still further discovery is that the randomly spaced clouds of carbon particles, which cross the viewing path of an infrared sensing head are, because of their small size, close in temperature to the gas itself and that the presence of these carbon particles in the viewing path is characterized on an oscilloscope trace of the infrared sensing head output by definite peaks in instataneous output. In the particular engine tested, these peaks were found to occur approximately 1 percent of the engine running time, a percentage which will, of course, vary from engine to engine as described above with reference to the clear flame periods.

OBJECTS OF THE INVENTION

It is an object of this invention to utilize the observations and discoveries described above to provide a temperature measuring system for a gas turbine engine which can measure relatively high combustion gas temperatures occurring therein and similarly measure relatively high temperatures of selected metal surfaces in or adjacent the combustor of a gas turbine engine.

A further object of the invention is to provide a pyrometry method and apparatus for measuring gas turbine combustor and metal surface temperatures wherein compensation is made for inaccuracies of measurement caused by random interspersion of carbon particle clouds between an infrared sensing head and a target metal surface.

SUMMARY OF THE INVENTION

Briefly stated, one aspect of the present invention is a method of measuring temperatures in a flow field including a solid member over which a hot gas stream flows with a dispersion of small particles therein randomly varying from a minimal to a maximum concentration. The method includes the steps of obtaining with an infrared detector an indication of the infrared radiation level emitting from the solid member and from the flow field in proximity thereto, converting this indication into a continuous signal, the strength of which varies in magnitude between minimum and maximum extreme values as a function of the presence of a minimal or maximum concentration of the entrained particles in the flow field, and selectively detecting short duration pulses of at least one of these extreme values to obtain an indication of the temperature of either the gas stream or the solid member.

Another aspect of this invention is an infrared pyrometry system or apparatus for measuring temperatures in a flow field as described above, which system includes infrared radiation detecting means disposed so as to receive radiation from both the solid member and from the hot gas stream passing between the detecting means and the solid member and to provide an output signal in response thereto. The system further includes a signal processor for reducing such output signals to a meaningful indication of the temperature of either the solid member or the gas stream. The signal processor includes weighting means which, in determining the temperature of the solid member, apply a high weighting to data read during the short time intervals when the gas stream becomes clear and a low weighting to data read at all other times. In determining gas stream temperatures, the weighting means apply a high weighting to data read during the short time intervals when the flame becomes clouded with carbon particles and a low weighting to data read at all other times.

BRIEF DESCRIPTION OF THE DRAWINGS

While this specification concludes with claims distinctly claiming and particularly pointing out the invention described herein, it is believed that it will be better understood by reference to the following description and accompanying drawings in which:

DESCRIPTION OF THE PREFERRED EMBODIMENTS

Figure 1:
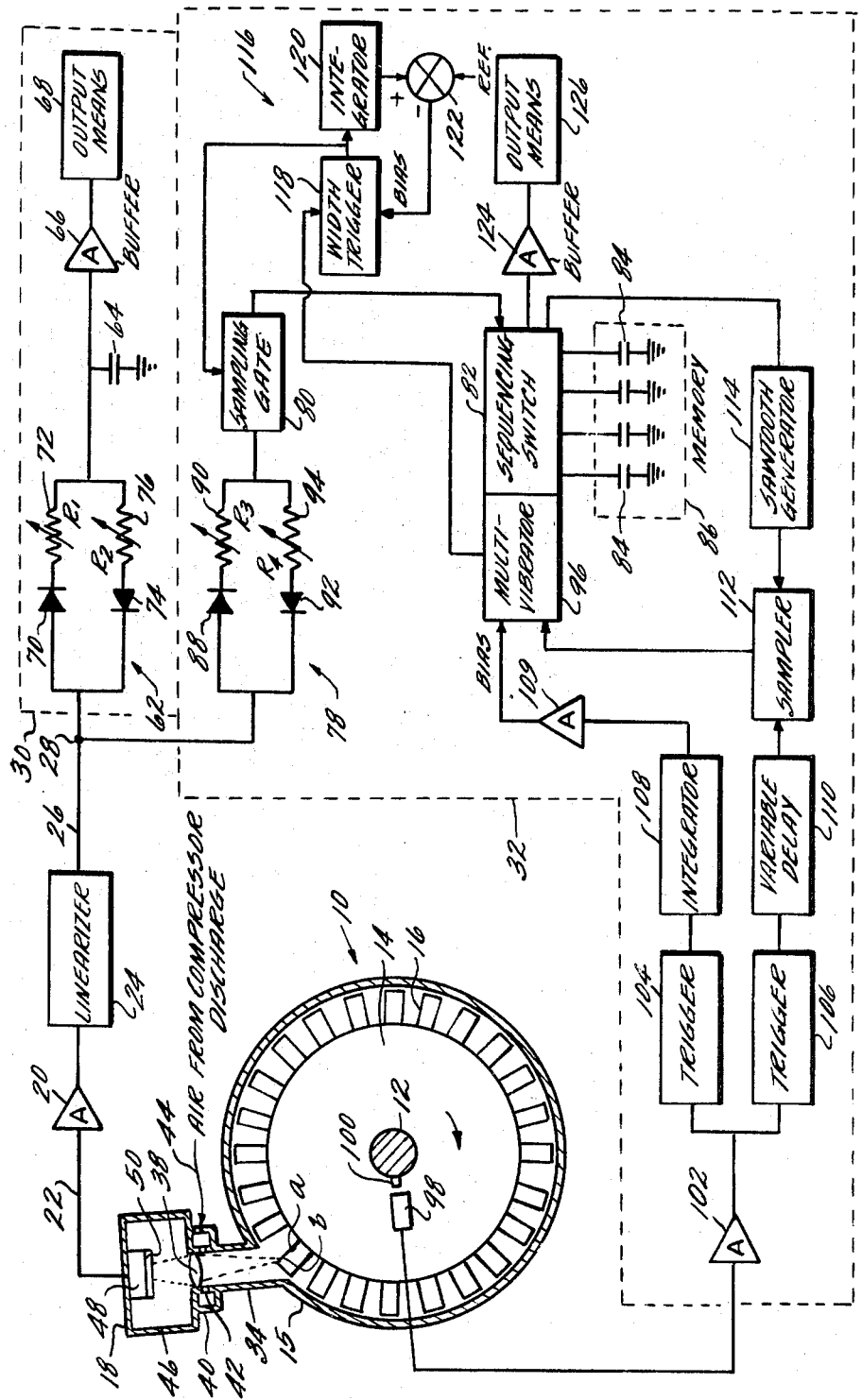
FIG. 1 is a schematic view of a preferred embodiment of the invention.

FIG. 1 illustrates schematically the pyrometry system which embodies the present invention. A cross-section of the turbine portion of a typical gas turbine engine is shown at 10 and includes a rotor shaft 12, turbine disc 14 attached to the shaft 12 and rotating therewith, and turbine blades 16 attached to the periphery of disc 14. An infrared radiation detecting means 18 is secured to the casing 15 of engine 10 at an axial location overlying blades 16 and at an angle to a radial line passing through the point of attachment. The electrical signal generated in sensing means 18 is transmitted to an amplifier 20 by an electrical conductor 22, and the amplified signal is then passed to linearizer 24 which proved an output signal which is linear with temperature to electrical conductor 26 which conducts the linearized output to junction 28 for transmission to the gas temperature signal processor 30 and blade temperature signal processor 32 (both described below).

Sensing means 18 comprises a sight tube 34 secured to casing 15 and axially aligned with its center line intersecting the surface of blades 16 as they pass sight tube 34 during rotation of disc 14. A lens 38 is mounted adjacent the upper end of sight tube 34 and adapted to focus radiation from surface of blades 16 to sensor 48. Sight tube 34 is additionally provided with a manifold 40 which is adapted to accept engine compressor discharge air from conduit 44 and pass it through purge holes 42 to purge sight tube 34 of any carbon particles which might tend to enter tube 34 and coat lens 38. To further promote the purging action, sight tube 34 is provided with coarse threads on its internal surface to dampen vortices that may be created in the lower end of tube 34 during passage of combustion gases thereover and tend to cause circulation of combustion gases in tube 34 to lens 38. An added benefit of the described threads is reduction of light reflections in sight tube 34.

A housing structure 46 is secured to the upper end of sight tube 34 and contains radiation sensor 48. Housing 46 can be further adapted to contain amplifier 20 and linearizer 24, and can be cooled by well known means to maintain the environments surrounding the electrical components at an acceptable level. A spectral filter 50 is interposed between lens 38 and sensor 48, which can be for example, a silicon photodiode, to minimize the effect of interfering sources of thermalradiation in the engine combustion system.

Besides the carbon particles described above which interfere with metal surface temperature measurement, several other sources of interference exist in a gas turbine engine some of whose effects can be minimized or eliminated by appropriate selection of filter 50.

Two of the sources which can be filtered have their origin in the combustor flame, i.e., chemiluminescence and molecular infrared radiation. The first of these, chemiluminescence, occurs during the combustion process and is characterized by intense ultraviolet emission and weaker visible light emission, principally in wave lengths shorter than about .52 microns. The pyrometer will reject this if the spectral sensitivity is restricted to longer wave lengths than .52 microns. The second source of interference having its origin in the combustor flame is molecular infrared emissions of the gaseous combustion products, carbon dioxide and water vapor. These emissions have a significant intensity in the 2.7 to 3.0 microns wave band weaker emissions at 1.8 and .92 microns. These latter emissions appear in the turbine inlet gases and pass through the viewing beam from sight tube 34 for a greater fraction of the blade travel time. However, for the predicted distribution of temperature in turbine inlet gases, the wave bands of 1.8 microns and longer are thought to be significant insofar as interference is concerned. This interference source can, therefore, be avoided by selecting a detector having no response to these bands.

Figure 2:
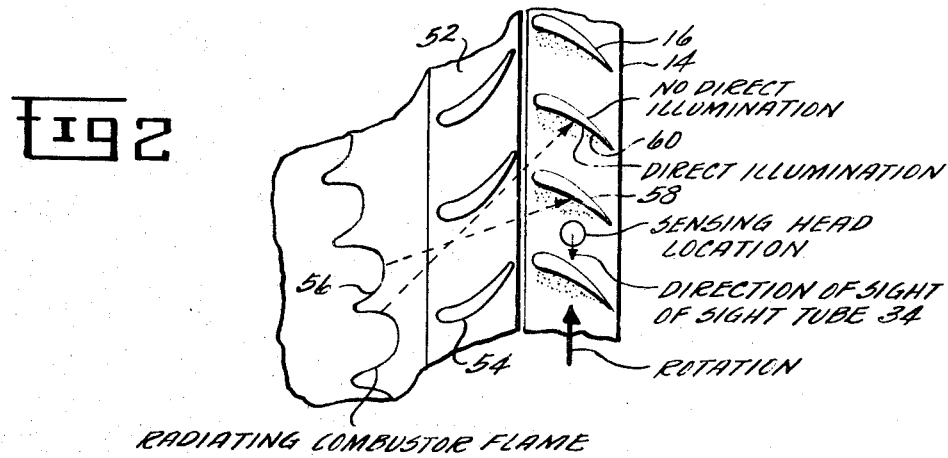
FIG. 2 is a partially schematic plan view of the combustor and turbine section of a gas turbine engine showing the illumination of turbine blades by a radiating combustor flame.

A further source of interference with accurate pyrometer outputs is light reflected from the metal surface whose temperature is to be measured. If the temperature to be measured is that of the turbine, blades 16, this effect can, however, be minimized. Referring to FIG. 2, light having its origin in the combustor flame 56 must pass through turbine nozzle 52, which comprises a plurality of stators 54, to turbine blades 16. As illustrated in the drawing, stators 54 effectively block combustor flame radiation from reaching the convex surfaces 58 of turbine blades 16 while permitting the same radiation to be reflected off the concave sides 60 of blades 16. Thus, by orienting sight tube 34 to intersect surfaces 58 instead of surfaces 60 the interference from reflected light can be minimized.

Referring again to FIG. 1, the gas temperature signal processor 30 comprises a resistance network 62 serially connected with a grounded capacitor 64, and a buffer amplifier 66 connected at its input side to capacitor 64 and connected at its output side to an output means 68.

Resistance network 62 has two legs, a capacitor charging leg and a capacitor discharging leg. The charging leg comprises a diode 70 connected to resist conventional current flow from the capacitor 64 to linearizer 24 and a variable resistor 72 (having a resistance designated R1), to provide a variably adjustable charging time constant for the resistor 72 – capacitor 64 combination. The discharge leg of resistance network 62 comprises a diode 74 connected to resist conventional current flow from linearizer 24 to capacitor 64 and a second variable resistor 76 (having a resistance designated R2) to provide a variable adjustable discharge time constant for the resistor 76–capacitor 64–combination. When the circuit is adjusted for a particular engine, resistance R2 is adjusted to a value which is considerably greater than that of resistance R1 so that instantaneous peak outputs from detecting means 18 will be readily transmitted and stored on capacitor 64, whereas, when the instantaneous output from detecting means 18 is lower than the previously stored peak, capacitor 64 will be restricted to discharge quite slowly through resistor 76 and diode 74.

If one were interested only in the peak gas temperature obtained over a period of time, the leg comprising resistor 76 and diode 74 could be open circuited; however, it is necessary to allow some discharge of capacitor 64 between peak outputs from sensing means 18 so that the charge on a capacitor 64 can follow changes in gas temperature level occurring over a period of time. To this end, resistance R2 is therefore adjusted so that the discharge time constant of the circuit is sufficiently small to permit dissipation of a percentage of the charge on capacitor 64 between the peak outputs from detecting means 18. The exact discharge time constant to be chosen will depend upon several factors, among which are the average time interval between peak outputs from sensing means 18, and the rate of change of gas temperature which the circuit must follow. For example, knowing from experimental runs made on a particular engine that peak outputs from detecting means 18 occur on the average of every X seconds and having the requirement that circuit 30 be able to follow a gas temperature drop of 2 percent per second, resistance R2 would be adjusted to provide in combination with capacitor 64 a time constant designed to dissipate 2X percent of its normal potential at a selected design operating temperature in a time period of X seconds. Resistance R1 is selected to provide a charge time constant which is considerably smaller than the discharge time constant so that when peaks occur in the output from sensing means 18, they can be stored on capacitor 64 at nearly their full potential. Thus, at any given time, the charge on capacitor 64 will approximate the amplified and linearized immediately preceding peak output from detecting means 18, which peak is representative of a temperature of carbon particles contained in the gas turbine engine combustion gas stream, and which is in turn nearly equal to the gas temperature.

As previously stated buffer amplifier 66 and output means 68 are combined to permit readout of the potential on capacitor 64 for control or other purposes. Buffer amplifier 66 is the type which has a high input impedance to minimize dissipation of the charge on capacitor 64, and output means 68 can comprise anything from a visually read electrical meter to a sophisticated interface device for utilizing the charge on capacitor 64 in a temperature or gas turbine fuel control system.

The amplified and linearized output from detecting means 18 also provides an input to the metal temperature signal processor 32, which comprises a resistance network 78, a sampling gate 80 serially connected with network 78, a sequencing switch 82 serially connected with sampling gate 80, a group of storage capacitors 84 which provide a memory 86 for storing the temperatures of the individual blades 16, means (to be described below) for synchronizing sequencing switch 82 with rotation of shaft 12, means for controlling the width of the temperature sample which is stored in memory 86, and means for controlling the point on turbine blades 16 whose temperature is stored in memory 86.

Resistance network 78 operates inversely to network 62 in that in network 78 the charge time constant provided by combination of resistor 90 (having a resistance designated R3) and one of capacitors 84 is made considerably longer than the discharge time constant provided by resistor 94 (having a resistance designated R4) and the same one of capacitors 84. A diode 92 is provided in the discharging leg of network 78 to preclude conventional current flow from amplifier 20 through resistor 94 to memory 86, and a diode 88 is provided in the charging leg of network 78 to resist conventional current flow from memory 86 through resistor 90 to amplifier 20. Thus, distinct minimums in the instantaneous output of detecting means 18 will permit discharge of the appropriate capacitor 84 through relatively low resistance R4 to a potential approximating that of the minimum, and instantaneous outputs from detecting means 18 which exceed the previous minimum will be limited to charge the appropriate capacitor 84 to a potential above that minimum at a slow rate and to a limited degree. By permitting this slow charging of the appropriate capacitor 84 to a potential above the previous minimum, the circuit described can thus follow increases in the actual temperature of a particular point on one of the blades 16. To this end, the charge time constant provided by a resistor 90 – capacitor 84 combination must be limited to a value which is dependent upon the average time interval between definitive minimum instantaneous outputs from detecting means 18 and also dependent upon the rate of temperature rise which the circuit must follow. Determination of the appropriate charge time constant (and hence appropriate value of resistance R3) is made similarly to the determination of the discharge time constant for signal processor 30 utilizing information experimentally determined from the particular engine model with which the invention is to be used.

Sequencing switch 82 is provided to direct the output from resistance network 78 through sampling gate 80 to the appropriate capacitor 84 and memory 86, there being one storage for each bucket 16 on the turbine. Thus, for proper operation, sequencing switch 82 must be in phase with rotor disc 14 and must run a complete cycle with each rotation of the engine rotor. This phase locked synchronization is accomplished by controlling the frequency of the sequencing switch 82 with a multivibrator 96 having a square wave output and a frequency controlled to operate at the frequency at which buckets 16 pass the line of sight of sight tube 34.

Multivibrator 96 is controlled by a closed loop which receives one input pulse for each revolution of the engine shaft 12 and a feedback signal at the completion of each cycle of sequencing switch 82. Operation of the loop is as follows. A magnetic variable reluctance pickup 98 is mounted to the engine 10 frame and is responsive to the presence of a small steel projection 100 on shaft 12 to generate a single electrical pulse upon each revolution of shaft 12. The pulse generated in pickup 98 is then amplified by amplifier 102 and used to drive two Schmitt triggers 104, 106. Trigger 104 has an output pulse duration of approximately 600 microseconds and trigger 106 has an output pulse duration of 2 microseconds. The 600 microsecond output pulse from trigger 104 is integrated by integrator 108, and the resulting DC voltage level is amplified by amplifier 109 and is used to bias the multivibrator frequency control so that the multivibrator frequency will be within 20 percent of the synchronizing pulse frequency with zero volts applied to the frequency control from the circuit which includes trigger 106.

The 2 microsecond output pulse from trigger 106 is passed through variable delay 110 and used to actuate a sampling gate in sampler 112. Upon actuation of the sampling gate, a signal from sawtooth generator 114 is allowed to pass through the gate and is processed in sampler 112 to provide a control input to multivibrator 96 which is a function of the instantaneous level of this sawtooth generator 114 output at the gating time. Sawtooth generator 114 output cyclicly has booth negative and positive values, and the direction and magnitude of a control potential applied to multivibrator 96 from sawtooth generator 114 depends upon the position of generator 114 output in its cycle when the pulse from trigger 106 is received in sampler 112. If sawtooth generator 114, which operates at sequencing switch 82 frequency, is too slow, its output at the time sampler 112 is triggered by trigger 106 will have a positive value which will be transmitted to the control input of multivibrator 96 and act to increase its frequency. Conversely, if sequencing switch 82 frequency exceeds that of the engine, the output of sawtooth generator 114 at the time when sampler 112 is triggered by trigger 106 will be a negative value which will be transmitted to the control input of multivibrator 96 and act to decrease its frequency.

Other sequencing switch 82 – rotor shaft 12 synchronization schemes are familiar to persons skilled in the control arts and can be provided to replace the synchronization system described.

The function of variable delay 110 is directed to the radial location on blade 16 at which a temperature sample is taken. If the delay is set at zero, the point in engine rotation at which trigger 106 triggers sampler 112 and thus steps sequencing switch 82 to connect sampling gate 80 with the appropriate capacitor 84 in memory 86 will occur at point "a" on blades 16. If, on the other hand, a time delay is introduced by delay 110 into the receipt by sampler 112 of the output pulse from trigger 106, engine rotor 12 will rotate a small amount until axis of sight tube 34 intersects a blade 16 at, for example, point "b," before the output pulse from trigger 106 actuates sampler 112 to pass the sawtooth generator 114 signal to multivibrator 96 and thus steps sequencing switch 82, thereby connecting the storage capacitor 84 which corresponds to the particular blade whose temperature is being measured with the signal from sampling gate 80.

A sample width control device 116 is provided to control the radial length of a blade 16 over which a temperature sample is recorded. Device 116 comprises a width trigger 118 which is activated by the output of multivibrator 96 the same time that multivibrator 96 causes sequencing switch 82 to connect the output from sampling gate 80 to the appropriate storage capacitor 84.

The output of width trigger 118, which is a square wave pulse of controlled width, then activates sampling gate 80 to allow passage of the signal from resistance network 78 to sequencing switch 82 for a regulated time period. Width trigger 118 comprises an ordinary Schmitt trigger, which detects whether an input signal is above or below a present limit and provides an output signal of one value if above the limit and of another value if below the limit, coupled with means for converting the square wave output pulse of the multivibrator 96 into an exponential pulse to provide the input to the Schmitt trigger. If the input signal to the Schmitt trigger is the exponential pulse superimposed upon a DC level, the Schmitt trigger output pulse width can be changed by adjusting that DC level inasmuch as the input to the Schmitt trigger will be above the mentioned preset limit for a period of time dependent upon the decay characteristic of the particular exponential input pulse and the DC level upon which it is superimposed. To control this DC level, and thus the width trigger output pulse duration, the output pulse is integrated by integrator 120 and averaged over many periods to provide a DC level proportional to the pulse duty cycle. The integrated output is then compared in comparator 122 with a fixed DC reference which is proportional to the desired pulse width, and any difference between the integrated Schmitt trigger output and the DC reference is fed back to the Schmitt trigger circuit as a bias on the DC component of the Schmitt trigger input.

The output signals representative of the temperatures of the various blades 16 can be obtained from the memory 86 in several ways. One such method indicated schematically in FIG. 1 is to have sequencing switch 82 sequentially connect the buffer amplifier 124 with each of the storage capacitors 84, which connection may be made at the same time that sampling gate 80 is connected with the particular capacitor 84 or may be made prior to or after the sampling gate 80 connection. Buffer amplifier 124, which is a high input impedance amplifier similar to amplifier 66, will amplify the potential existing on the particular capacitor 84 and transmit the amplified signal to output means 126. As stated above in connection with means 68, output means 126 can comprise any one of several devices ranging in complexity and sophistication from a simple electrical meter, to an interface device connecting the temperature signal to an engine temperature control or override apparatus, to a continuous recording and data system.

The blade temperature signal processor 32 described above is particularly adapted to provide an output representative of the temperature at a given time of a particular point on a particular turbine blade 16. Such a device is especially useful in the test cell during development phases of an engine program and may be similarly useful for purposes of engine in-flight condition monitoring. A variation on the processor 32 described which might also be useful in an engine fuel control override is one which would sequentially sample the temperature on a series of blades and store it on a single memory storage capacitor 84. One obvious means for accomplishing this is to use the basic circuit shown for gas temperature signal processor 30, substituting however resistance network 78 for the resistance network 62 shown for processor 30 so that the resulting signal processor would store detected instantaneous minimum infrared outputs, which as explained above are representative of blade temperature. Other variations, such as using multivibrator controlled to a frequency which is a fraction or multiple of shaft 12 rotational frequency to actuate a sampling gate permitting storage of the temperature responsive detecting means 18 output signal on a storage capacitor would be equally obvious in view of the disclosure herein to persons skilled in the art.

Figure 3:
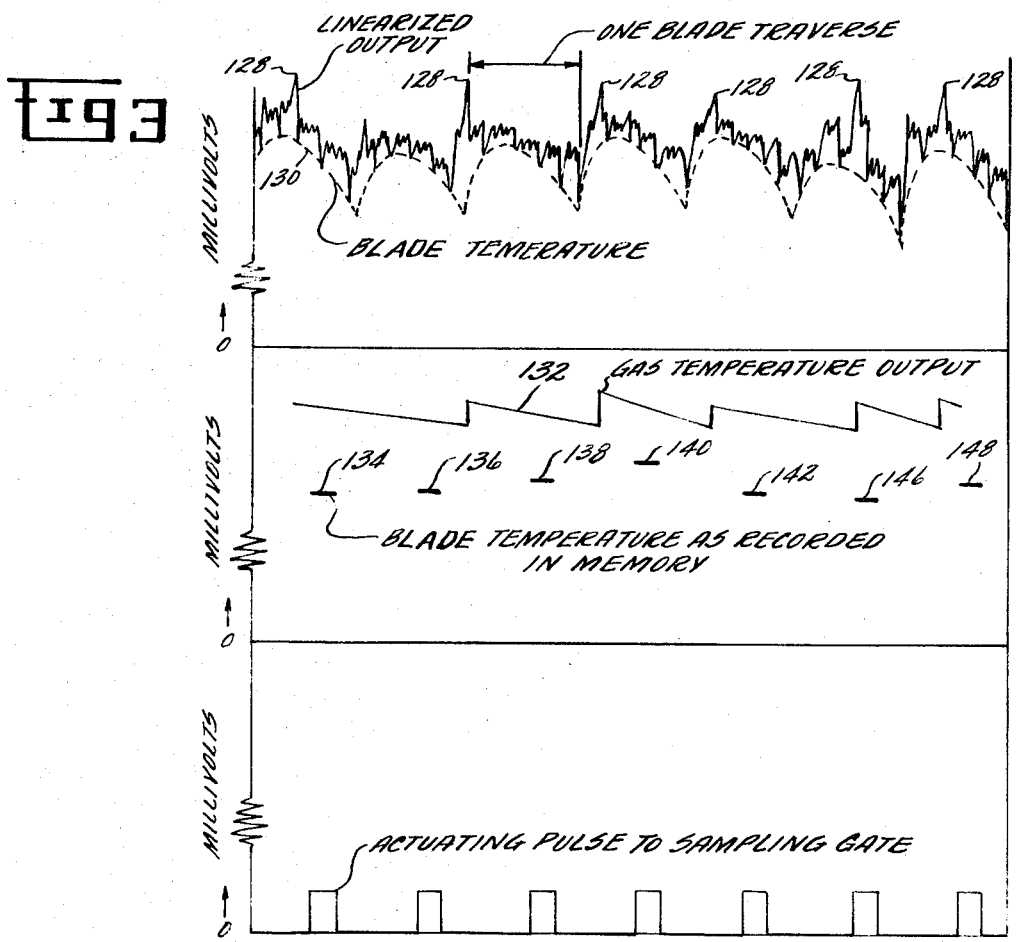
FIG. 3 is a chart showing the relationship between sensing and output, signal processor output, and the actual rating pulses to a temperature sampling gate.

FIG. 3 illustrates the typical form of the output signals from the various system components. In the upper portion of the figure, the output from linearizer 24 is shown as a randomly varying line having peaks 128 (which are representative of linearizer 24 output when carbon particles are directly interposed in the line of sight of sight tube 34) and a plurality of distinct minimums (which are representative of the condition occurring when there is almost complete absence of carbon particles from the line of sight of sight tube 34). A plot of distinct minimum value is represented by broken line 130. The wave form of line 130 represents the temperature distribution radially along a typical turbine blade 16 over one complete blade traverse. As is clear from the above description, however, the output of the sensor would follow the line 130 only if no carbon particles appeared between the sensor and the blade 16 during the time interval required for one blade to pass the sensor.

The center part of the figure illustrates the time variation of the charge on storage capacitor 64 and, thus the signal to output means 68. The curve 132 shown, as explained in connection with the description of signal processor 30, has a form in which there are definite peaks corresponding in time to peaks 128, and which slowly decays a small percentage of the peak value until the next peak 128 is detected in sensing means 18. Also shown in the center part of FIG. 3 are blade temperature levels 134 – 148 which are stored in memory 86 during the duration of the actuating pulse to the sampling gate (shown in the lower part of FIG. 3) and which each occur at corresponding positions in the blade traverse. As discussed in connection with the signal processor 32 above, the level of each of indications 134 – 148 is representative of the actual minimum level of broken line 130 during the particular time of sampling. In other words, the level of each of the indications 134 – 148 is representative of the temperature of a particular point on each of the blades 16. The location of this particular point is, of course, controlled by operation of the variable delay 110, as described above; while the width of the point is controlled by operation of the width trigger 118, also as described above. By setting the width trigger 118 properly, one could measure the entire length (or width) of each of the blades 16 during a single revolution of the disc 14 and, because of the operation of the resistance network 78 previously discussed, obtain a weighted average temperature of the blade 16. (The output is weighted to the extent that the resistance network 78 applies a high weighting to data read during the short time intervals when the gas stream becomes clear and a low weighting to data read at all other times.) In the practical case, however, the temperature of discrete points on the blades 16 would be of greater interest than would an average blade temperature. As previously discussed, the location of this point could be varied by proper operation of the variable delay 110 and/or the width trigger 118.

Having thus described the invention, what is desired to be secured by letters patent is as follows.

What is claimed is:

1. An infrared pyrometry system for indicating temperatures in a gas turbine engine having a flow field including a plurality of rotating turbomachinery blades over which a hot gas stream flows with a dispersion of carbon particles therein randomly varying from a minimal concentration to a maximum concentration, said system comprising:
- a sensor focused across said field and providing signals proportional to energy radiation therefrom,
- means for deriving from said sensor a multiplicity of signals of extremely short duration in rapid succession, the strength of said signals varying in magnitude between minimum and maximum extreme values as a function of the presence of a minimal or maximum concentration of entrained particles in the hot gas stream, and
- means for selectively detecting short duration pulses of maximum values, thereby providing an output indicative of actual gas temperature, said detecting means comprising,
- a resistance network having a higher resistance to conventional current flow toward said sensor than the resistance to current flow from said sensor,
- a grounded capacitor connected to said radiation network such that said resistance network is interposed serially between said sensor and said capacitor, and
- output means connected to said capacitor to provide an output from said detecting means which is proportional to the charge on said capacitor.

2. An infrared pyrometry system for indicating temperatures in a gas turbine engine having a flow field including a plurality of rotating turbomachinery blades over which a hot gas stream flows with a dispersion of carbon particles therein randomly varying from a minimal concentration to a maximum concentration, said system comprising:
- a sensor focused across said field and providing signals proportional to energy radiation therefrom,
- means for deriving from said sensor a multiplicity of signals of extremely short duration in rapid succession, the strength of said signals varying in magnitude between minimum and maximum extreme values as a function of the presence of a minimal or maximum concentration of entrained particles in the hot gas stream, and
- means for selectively detecting short duration pulses of said minimum values, thereby providing an output indicative of the temperature of said blades, said detecting means comprising,
- a resistance network having a higher resistance to conventional current flow away from said sensor than the resistance to current flow toward said sensor, at least one grounded capacitor connected to said resistance network such that said resistance network is interposed serially between said detecting means and said capacitor, and output means connected to said capacitor to provide an output from said detecting means which is proportional to the charge on said capacitor.

3. A temperature indicating system as recited in claim 2, said system being further characterized in that
- said detecting means includes a plurality of grounded capacitors each adapted to be sequentially serially connected with said resistance network,
- said detecting means further includes means for sequentially connecting said capacitors with said resistance network in a frequency relationship which is a function of the passage of said blades past said sensor, and said output means is adapted to selectively connect to said capacitors to provide said output.

4. A temperature indicating system as recited in claim 3 wherein said means for sequentially connecting said capacitors includes means to synchronize the connection of the said capacitor to said resistance network with the passage of one of said blades into view of said sensor.

5. A temperature indicating system as recited in claim 4 wherein said means for sequentially connecting said capacitors includes means for regulating the time interval during which each said capacitor is connected to said resistance network.

6. A temperature indicating system as recited in claim 5 wherein said means for sequentially connecting said capacitors is adapted to connect said capacitors to said resistance network at a frequency which is unequal to but some function of the frequency at which said blades pass the view of said sensor.

7. A temperature indicating system as recited in claim 6 wherein said sensor comprises,
- a sight tube adapted for mounting to the casing of said gas turbine engine with its axis intersecting the bladed portion of the turbine in said engine,
- a housing connected atop said sight tube,
- a photosensitive electric device mounted in said housing,
- a lens mounted in said sight tube near its top and adapted to focus radiation onto said photosensitive device from a source exterior of said sight tube,
- a spectral filter mounted in said housing and interposed between said lens and said photosensitive device, and
- signal amplification means connected to the output of said photosensitive device, said sight tube including means for supplying air to the interior thereof adjacent said lens and further including threads on the internal surface thereof to dampen vortices that enter the lower end of the sight tube during passage of combustion gases thereover and to reduce light reflection inside the said tube.

8. A method of optically measuring temperatures in a gas turbine engine having a flow field including a plurality of turbomachinery blades over which a hot gas stream flows with a dispersion of carbon particles therein randomly varying from a minimal concentration to a maximum concentration, said method comprising:
- obtaining with an infrared detector an indication of the infrared radiation level emitting from said blades and said flow field in proximity thereto,
- converting said indication into a continuous signal, the strength of which varies in magnitude between the minimum and maximum extreme values as a function of the presence of a minimal or maximum concentration of the entrained particles in the hot gas stream, and
- selectively detecting short duration pulses of at least one of said extreme values to obtain an indication of the temperature of said particles, and hence the temperature of the hot gas stream, or the temperature of said blades.

9. The method recited in claim 8 wherein short duration pulses of maximum values are detected, thereby providing an output indicative of actual gas temperature.

10. The method recited in claim 8 wherein short duration pulses of minimum values are detected, thereby providing an output indicative of the temperature of said blade.

* * * * *